(12) United States Patent
Lim

(10) Patent No.: US 12,043,167 B2
(45) Date of Patent: Jul. 23, 2024

(54) APPARATUS FOR SIDE PROJECTION LAMP OF A MOBILITY DEVICE

(71) Applicants: Hyundai Motor Company, Seoul (KR); Kia Corporation, Seoul (KR)

(72) Inventor: Jung Wook Lim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 203 days.

(21) Appl. No.: 17/821,591

(22) Filed: Aug. 23, 2022

(65) Prior Publication Data

US 2023/0158943 A1 May 25, 2023

(30) Foreign Application Priority Data

Nov. 24, 2021 (KR) .................. 10-2021-0163662

(51) Int. Cl.
| | |
|---|---|
| *B60Q 1/24* | (2006.01) |
| *B60Q 3/70* | (2017.01) |
| *B60R 1/26* | (2022.01) |
| *B60R 11/04* | (2006.01) |
| *G03B 21/14* | (2006.01) |
| *G03B 21/28* | (2006.01) |

(52) U.S. Cl.
CPC ............ *B60Q 1/247* (2022.05); *B60Q 3/70* (2017.02); *B60R 1/26* (2022.01); *B60R 11/04* (2013.01); *G03B 21/145* (2013.01); *G03B 21/28* (2013.01)

(58) Field of Classification Search
None
See application file for complete search history.

(56) References Cited

U.S. PATENT DOCUMENTS

| | | | | |
|---|---|---|---|---|
| 3,592,535 | A * | 7/1971 | Gerry | G03B 31/06 353/15 |
| 4,003,644 | A * | 1/1977 | Aruanno | G03B 35/24 352/202 |
| 4,093,366 | A * | 6/1978 | Hapke | G03B 21/2053 352/198 |
| 5,353,204 | A * | 10/1994 | Kawamura | B60Q 1/0041 362/299 |
| 11,648,871 | B1 * | 5/2023 | Lan | B60Q 1/2607 340/458 |
| 2019/0191131 | A1 * | 6/2019 | Uchida | H04N 9/31 |
| 2020/0341120 | A1 * | 10/2020 | Ahn | F21S 41/321 |

(Continued)

FOREIGN PATENT DOCUMENTS

| | | | |
|---|---|---|---|
| CN | 217737104 U | * | 11/2022 |
| CN | 218858293 U | * | 4/2023 |

(Continued)

*Primary Examiner* — Srinivas Sathiraju
(74) *Attorney, Agent, or Firm* — MCDONNELL BOEHNEN HULBERT & BERGHOFF LLP

(57) ABSTRACT

Proposed is an apparatus for a side projection lamp of a mobility device having a structure as described may secure rear lateral sight from opposite lateral sides of the mobility device and illuminate light of a specific image on a road surface or an outer surface of the mobility device, thereby being allowed to communicate with a driver. In addition, as an image transmitter configured to generate the specific image is installed on a vehicle body or a door side, a size of a side part configured to secure rear sight may be reduced.

15 Claims, 16 Drawing Sheets

(56) References Cited

U.S. PATENT DOCUMENTS

| | | | |
|---|---|---|---|
| 2021/0033256 A1* | 2/2021 | Lim | F21S 41/39 |
| 2021/0247587 A1* | 8/2021 | Kayano | G03B 21/142 |
| 2021/0247672 A1* | 8/2021 | Nagatoshi | G02B 13/16 |
| 2021/0255528 A1* | 8/2021 | Kamigaki | G03B 21/145 |
| 2021/0262634 A1* | 8/2021 | Lim | F21S 41/43 |
| 2021/0270437 A1* | 9/2021 | Ahn | F21S 43/245 |
| 2021/0347295 A1* | 11/2021 | Ahn | B60Q 1/547 |
| 2022/0063493 A1* | 3/2022 | Park | B60Q 3/44 |
| 2022/0065426 A1* | 3/2022 | Lim | F21S 41/285 |
| 2022/0074574 A1* | 3/2022 | Lim | F21S 41/675 |
| 2022/0099263 A1* | 3/2022 | Ahn | F21S 41/141 |
| 2022/0099266 A1* | 3/2022 | Ahn | F21S 41/50 |
| 2022/0107069 A1* | 4/2022 | Lim | F21S 41/321 |
| 2023/0158943 A1* | 5/2023 | Lim | B60R 11/04 315/77 |

FOREIGN PATENT DOCUMENTS

| | | | | |
|---|---|---|---|---|
| DE | 202011000429 U1 * | 6/2011 | | B60Q 1/24 |
| JP | 2003068112 A * | 3/2003 | | |
| KR | 20120096316 A | 8/2012 | | |

* cited by examiner

APPARATUS FOR SIDE PROJECTION LAMP OF A MOBILITY DEVICE

CROSS REFERENCE TO RELATED APPLICATIONS

The present application claims priority to Korean Patent Application No. 10-2021-0163662, filed Nov. 24, 2021, the entire contents of which is incorporated herein for all purposes by this reference.

TECHNICAL FIELD

The present disclosure relates to an apparatus for a side projection lamp of a mobility device, the apparatus securing rear lateral sight from opposite lateral sides of the mobility device and illuminating light of a specific image to a road surface or an outer surface of the mobility device.

BACKGROUND

In general, in a mobility device, side mirrors are respectively mounted so that a driver may easily determine road conditions on a left, right, or rear side of a driving direction when driving.

The side mirror is installed on each side of the mobility device, thereby allowing the driver to recognize, through a mirror attached to a body of the side mirror, a driving direction or speed of other mobility devices driving to approach from the rear. Resulting from this, while driving the mobility device, the driver may safely change lanes or maintain a safe distance between the front and rear vehicles, thereby allowing the driving of the mobility device to be safely performed without interfering with operations of other mobility devices driving to approach from the rear.

As such, each side mirror is generally fixed to either one of the left and right body surfaces of the top of the headlamp or to the front side of the outer side of the door so that the driver may observe the traffic situation at the rear or the side.

On the other hand, in the case of the side mirror provided on a passenger seat side, the reflection angle of the mirror that the driver may see is very small because it is far from the driver's seat. Accordingly, in order to secure the driver's viewing angle, a mirror whose reflection angle is slightly convex from opposite sides of the mirror to the center is installed, but it has a critical defect that makes it almost impossible to secure a field of view in a blind spot.

The foregoing is intended merely to aid in the understanding of the background of the present disclosure, and is not to be regarded as to mean that the present disclosure falls within the purview of the related art that is already known to those skilled in the art.

SUMMARY

Accordingly, the present disclosure has been made keeping in mind the above problems occurring in the related art, and the present disclosure is intended to provide an apparatus for a side projection lamp of a mobility device, wherein the apparatus is capable of securing rear lateral sight from opposite lateral sides of the mobility device and of illuminating light of a specific image to a road surface or an outer surface of the mobility device, thereby being allowed to communicate with a driver.

In order to achieve the above objective, according to one aspect of the present disclosure, there may be provided an apparatus for a side projection lamp of a mobility device, the apparatus including: a side part installed on a vehicle body or a door, provided with a rear recognizer so as to secure rear lateral sight, and formed with a light movement space at the inside thereof; an image transmitter installed on the vehicle body or the door and illuminating light for forming at least one image into the light movement space of the side part; and a reflection unit installed in the light movement space of the side part and projecting the image on a road surface or an outer surface of the mobility device by reflecting the light illuminated from the image transmitter.

The rear recognizer may include a camera configured to obtain a photograph of an outside of a rear or lateral side of the mobility device and allow the obtained photograph to be output indoors.

The image transmitter may include: a light source configured to illuminate the light; a variable mirror configured to reflect the light illuminated from the light source to form the image; and a lens provided to make the light penetrate through a movement path of the light.

The apparatus may further include a magnification lens installed in the light movement space of the side part to allow the light reflected through the reflection unit to be incident thereon and configured to allow a size of the image according to the incident light to be adjusted.

The reflection unit may be configured to allow a projection position of the light illuminated from the image transmitter to be adjusted by being installed to be able to rotate in the light movement space of the side part.

The reflection unit may include: a mirror part installed to be able to rotate in the light movement space and configured to reflect the light illuminated from the image transmitter; and a rotation driving part configured to adjust a rotation position of the mirror part by being connected to the mirror part.

The mirror part may be installed to be able to rotate in the light movement space by the medium of a hinge part, and the rotation driving part may be configured to allow the mirror part to rotate together with the hinge part by being connected to the hinge part by a friction connection method or a gear connection method.

A guide slot may be extended in the light movement space of the side part, and the mirror part may have one end connected to the rotation driving part by the medium of a link unit composed of a plurality of links and an opposite end connected, to be movable, to the guide slot.

The rotation driving part may be formed with a cam portion formed eccentrically from a center axis, and the mirror part may be installed to have one end contacted with the cam portion and an opposite end to be able to rotate in the light movement space by the medium of a hinge part.

The mirror part may have one end to which an elastic body installed in the light movement space is connected, whereby the one end of the mirror part may come in contact with the cam portion by elastic force of the elastic body.

The side part may include: a neck part installed on the vehicle body or the door and provided with the light movement space and the reflection unit; and a head part installed at an end of the neck part and installed with the rear recognizer.

The neck part may include a base part installed on the vehicle body or the door and a sliding part that may move by sliding from the base part and to which the head part may be connected, wherein the light movement space may extend to communicate with the base part and the sliding part in a straight line.

The reflection unit may be installed in the light movement space of a side of the sliding part, thereby moving together with the sliding part.

The neck part may include a fixed part installed on the vehicle body or the door and a rotating part that may be installed to be able to rotate at an upper end of the fixed part and to which the head part may be connected, and the light movement space may be formed in the fixed part.

The image transmitter may be installed to be spaced apart from the side part, and a reflection mirror, configured to allow the light illuminated from the image transmitter to be reflected and moved to the light movement space, may be provided on the vehicle body or the side part.

An apparatus for a side projection lamp of a mobility device having a structure as described above can secure rear lateral sight from opposite lateral sides of the mobility device and illuminate light of a specific image on a road surface or an outer surface of the mobility device, thereby being allowed to communicate with a driver.

In addition, as an image transmitter configured to generate a specific image is installed on a vehicle body or a door side, a size of a side part configured to secure rear sight can be reduced.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Hereinbelow, an apparatus for a side projection lamp of a mobility device according to exemplary embodiments of the present disclosure will be described in detail with reference to the accompanying drawings.

Figure 1:
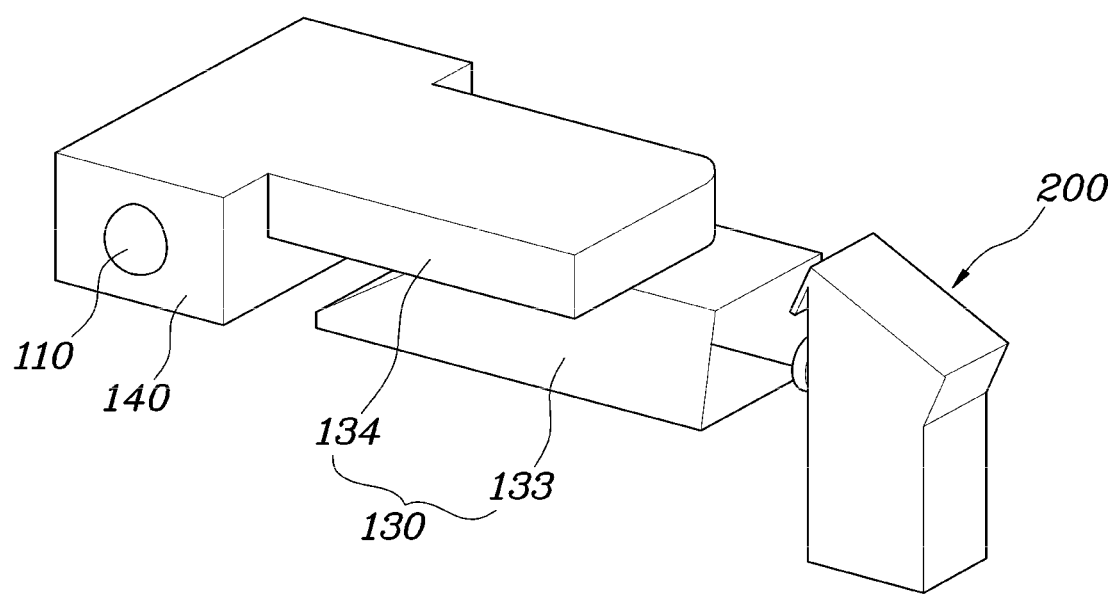
FIG. 1 is a view showing an apparatus for a side projection lamp of a mobility device according to the present disclosure.
Figure 2:
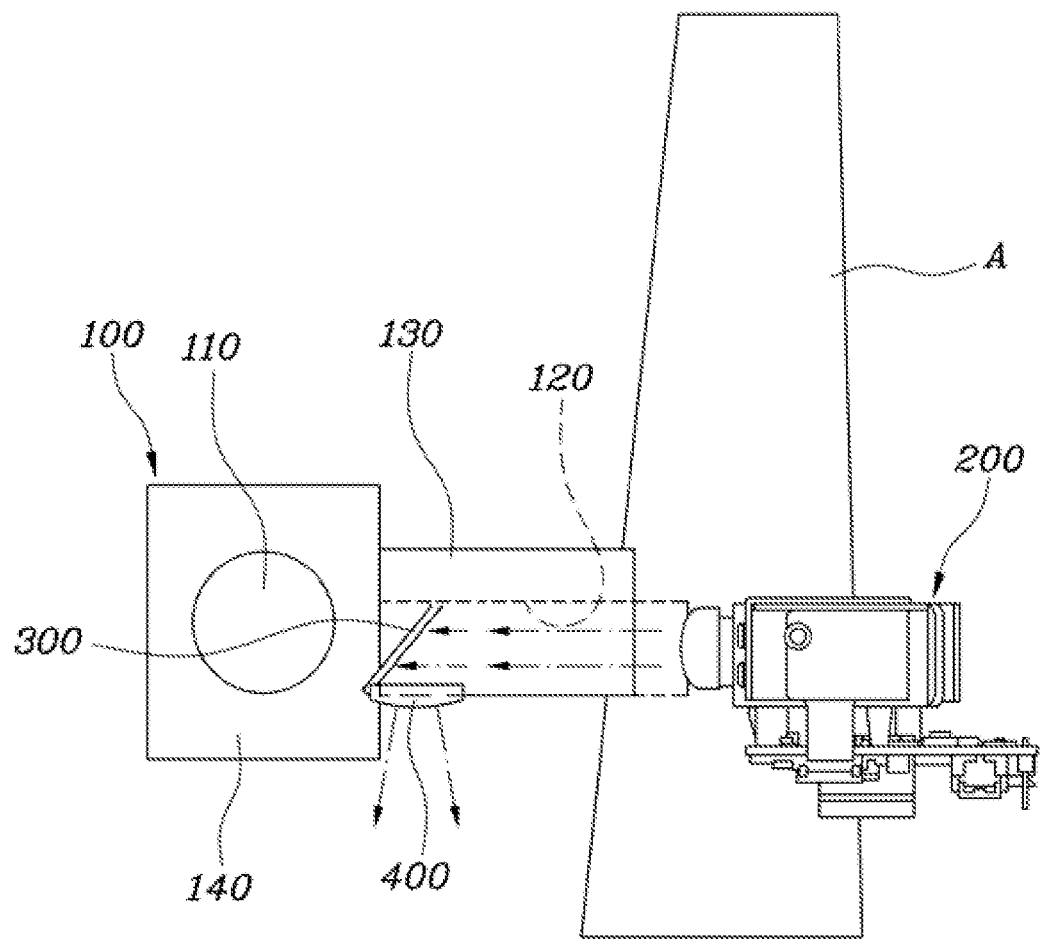
FIG. 2 is a block diagram showing an internal configuration of the apparatus for a side projection lamp of a mobility device illustrated in FIG. 1.
Figure 3:
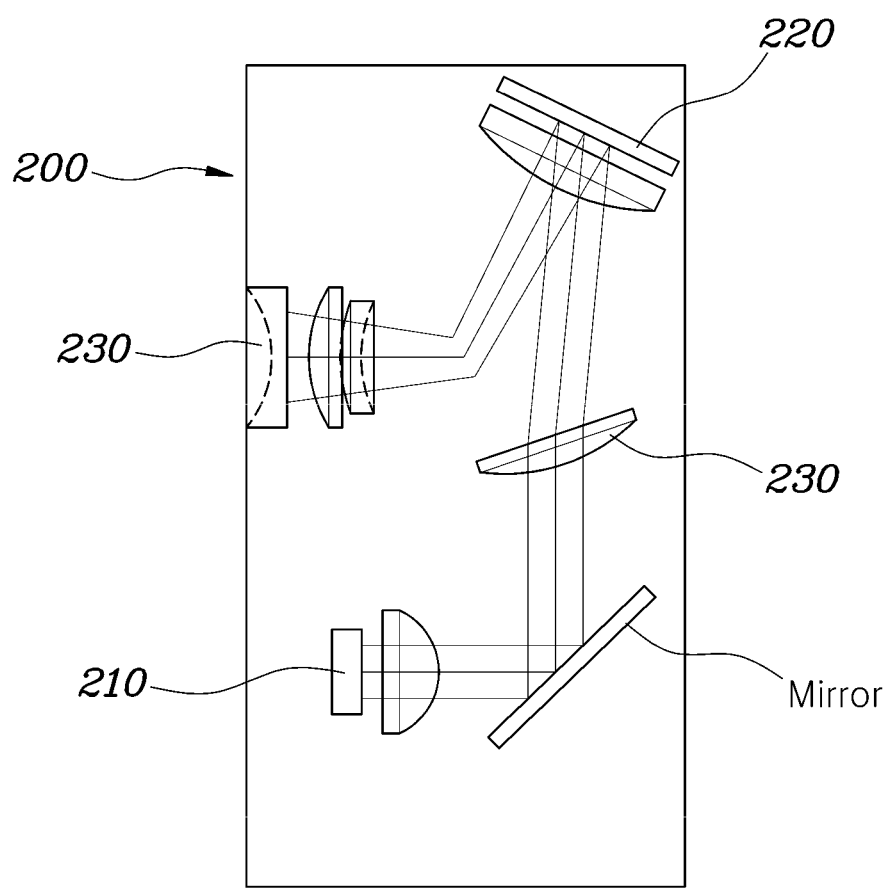
FIG. 3 is a view showing an embodiment of an image transmitter according to the present disclosure.
Figure 4:
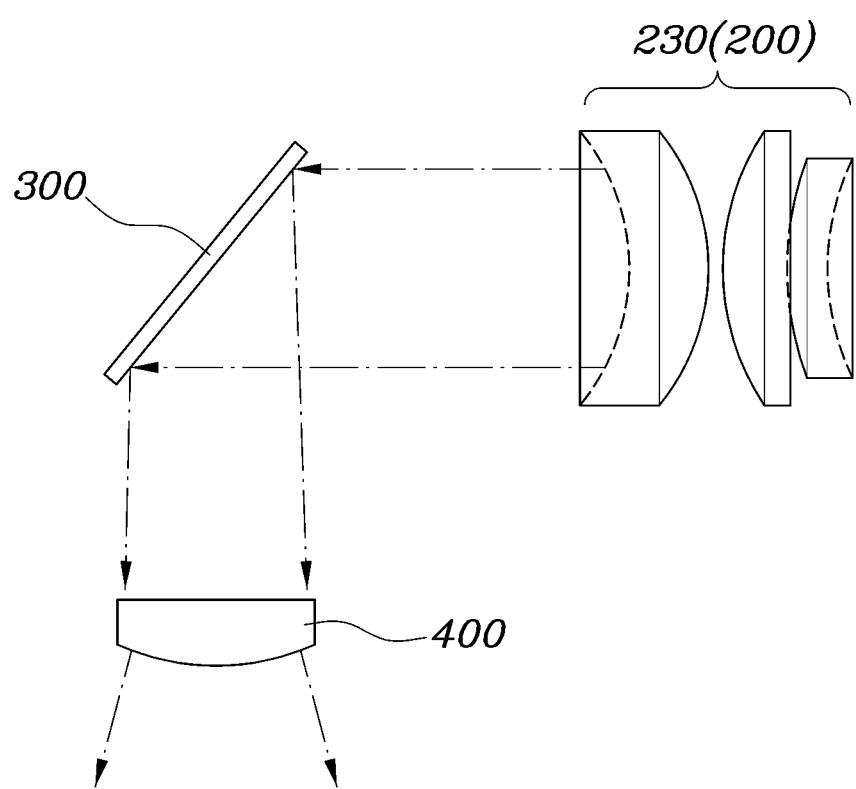
FIG. 4 is a schematic view showing the image transmitter, a reflection unit, and a magnification lens according to the present disclosure.

FIG. 1 is a view showing an apparatus for a side projection lamp of a mobility device according to the present disclosure, FIG. 2 is a block diagram showing an internal configuration of the apparatus for a side projection lamp of a mobility device illustrated in FIG. 1, FIG. 3 is a view showing an embodiment of an image transmitter according to the present disclosure, and FIG. 4 is a schematic view showing the image transmitter, a reflection unit, and a magnification lens according to the present disclosure.

Figure 5:
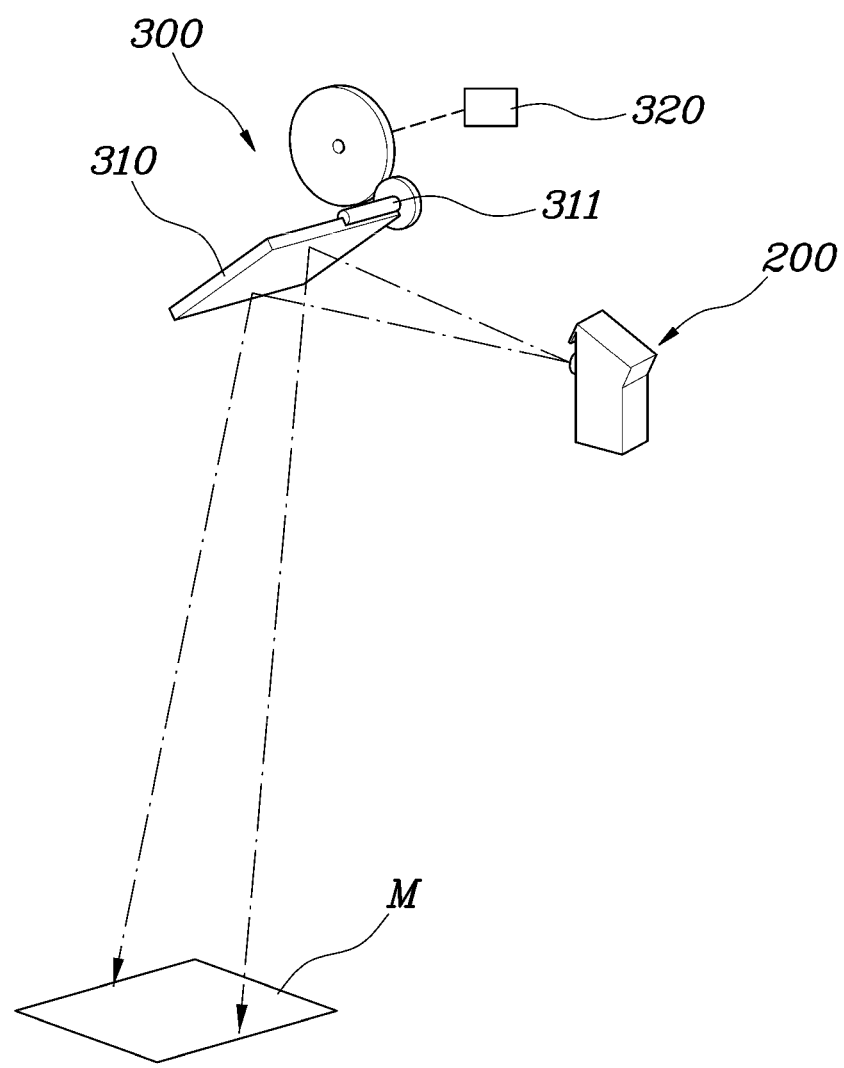
FIG. 5 is a view showing an embodiment of the reflection unit according to the present disclosure.
Figure 6:
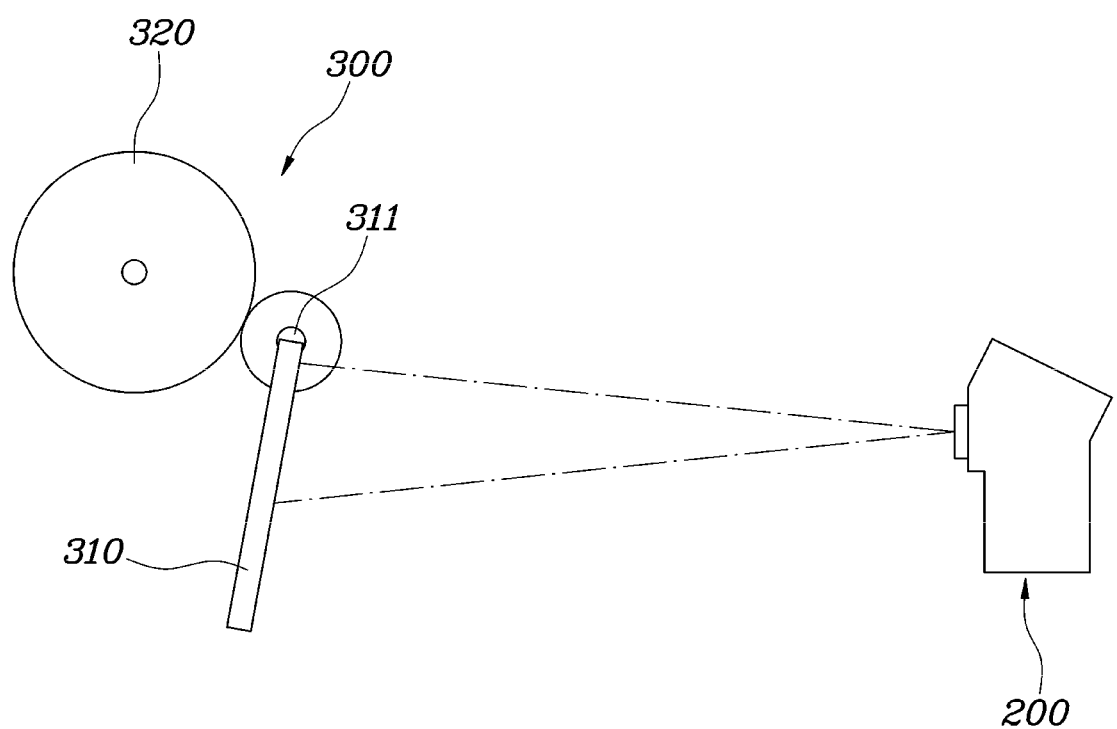
FIG. 6 is a view explaining the embodiment of the reflection unit illustrated in FIG. 5.

FIG. 5 is a view showing an embodiment of the reflection unit according to the present disclosure, and FIG. 6 is a view explaining the embodiment of the reflection unit illustrated in FIG. 5.

Figure 7:
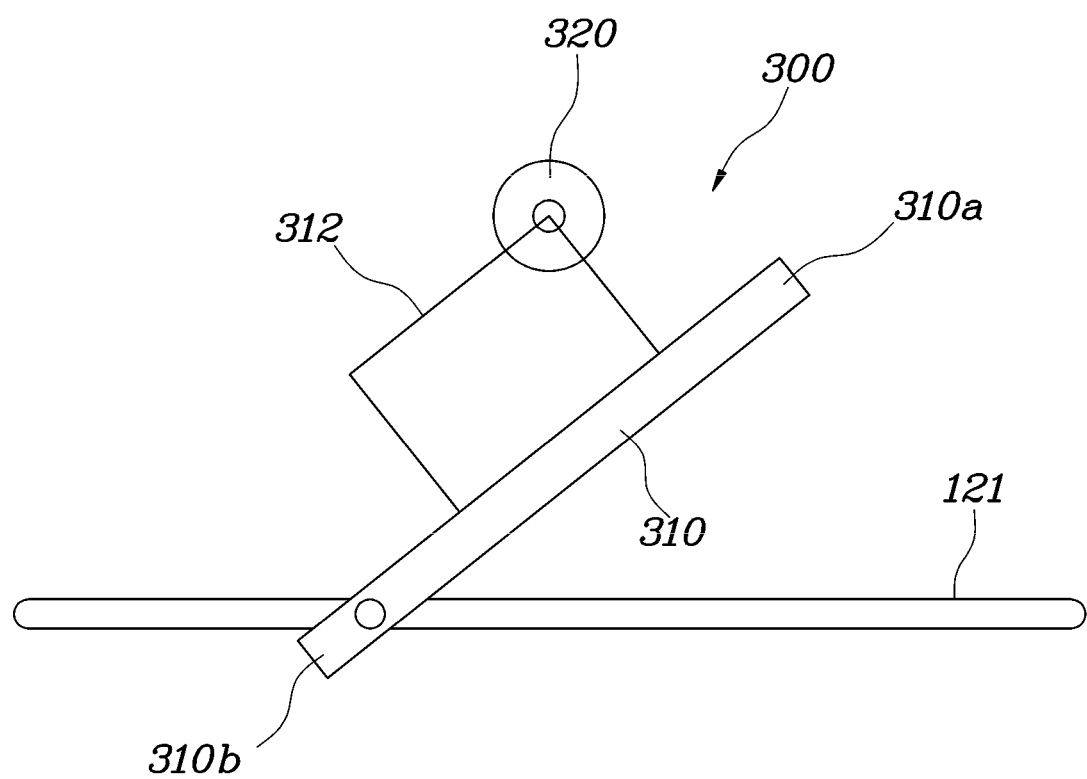
FIG. 7 is a view showing another embodiment of the reflection unit according to the present disclosure.
Figure 8:
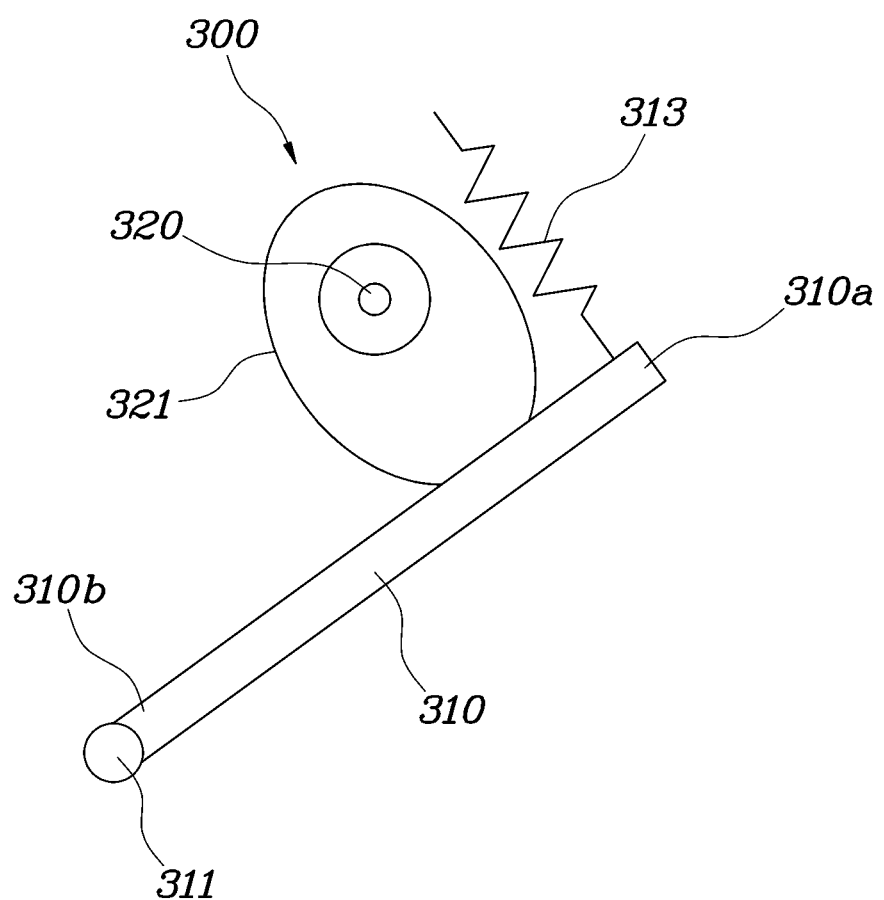
FIG. 8 is a view showing still another embodiment of the reflection unit according to the present disclosure.

Meanwhile, FIG. 7 is a view showing another embodiment of the reflection unit according to the present disclosure, and FIG. 8 is a view showing still another embodiment of the reflection unit according to the present disclosure.

Figure 9:
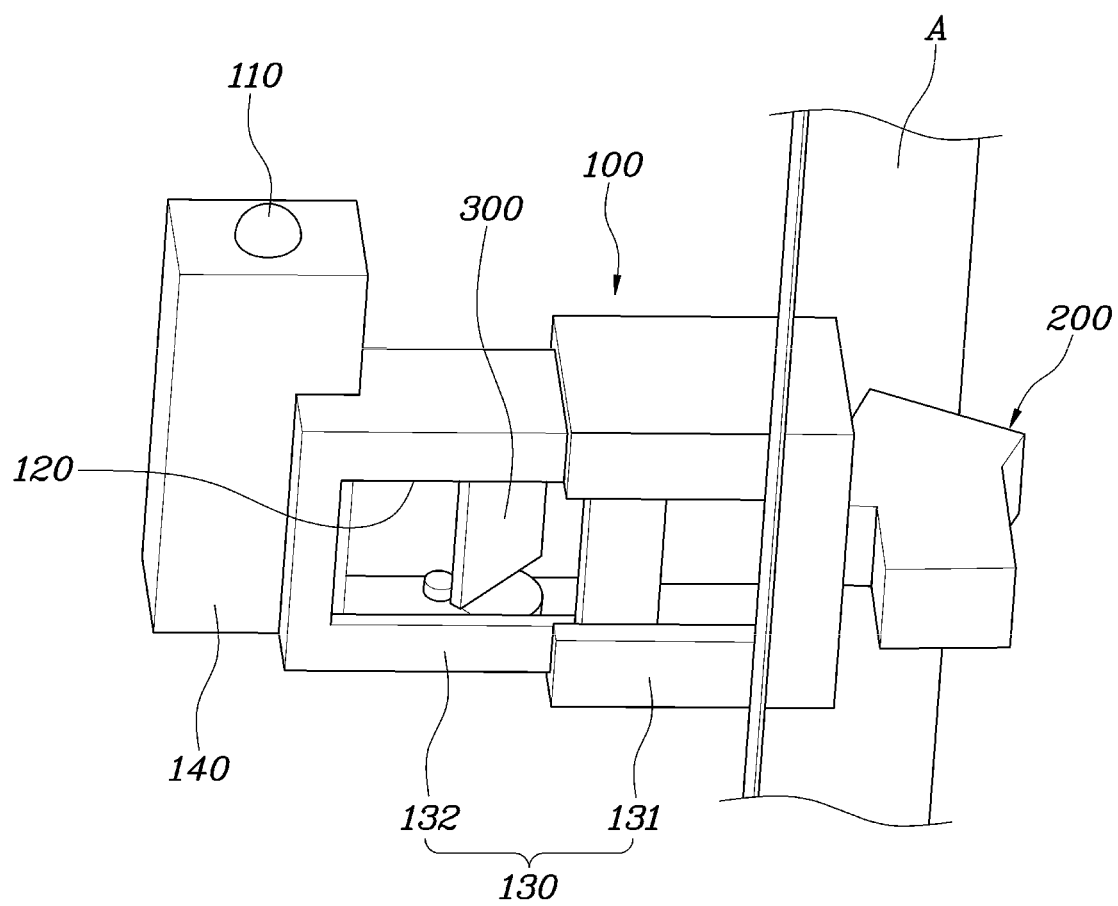
FIG. 9 is a view showing an embodiment of a side part according to the present disclosure.
Figure 10:
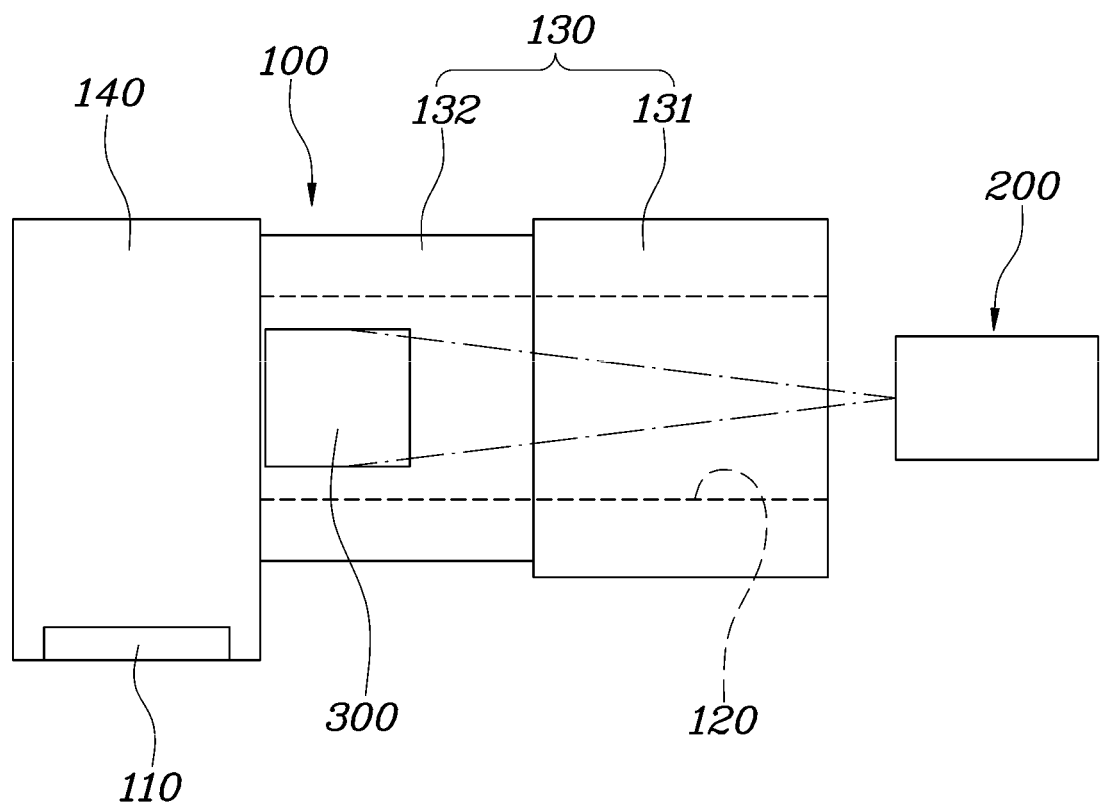
FIG. 10 is a view showing a developed state of the side part shown in FIG. 9.
Figure 11:
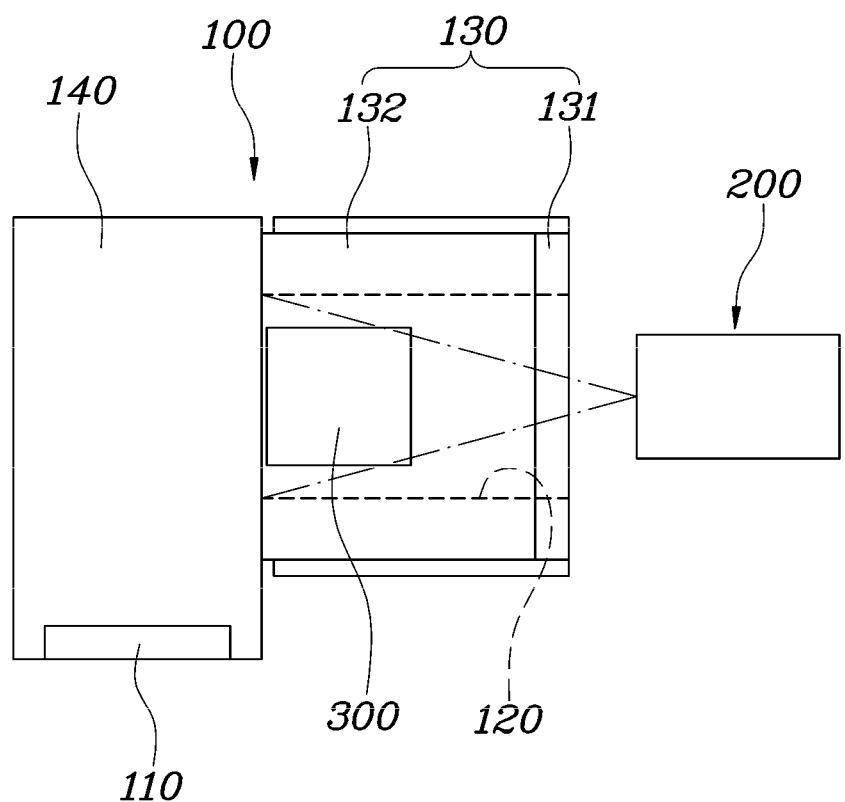
FIG. 11 is a view showing a state in which the side part illustrated in FIG. 9 is stowed.

FIG. 9 is a view showing an embodiment of a side part according to the present disclosure, FIG. 10 is a view showing a developed state of the side part shown in FIG. 9, and FIG. 11 is a view showing a state in which the side part illustrated in FIG. 9 is stowed.

Figure 12:
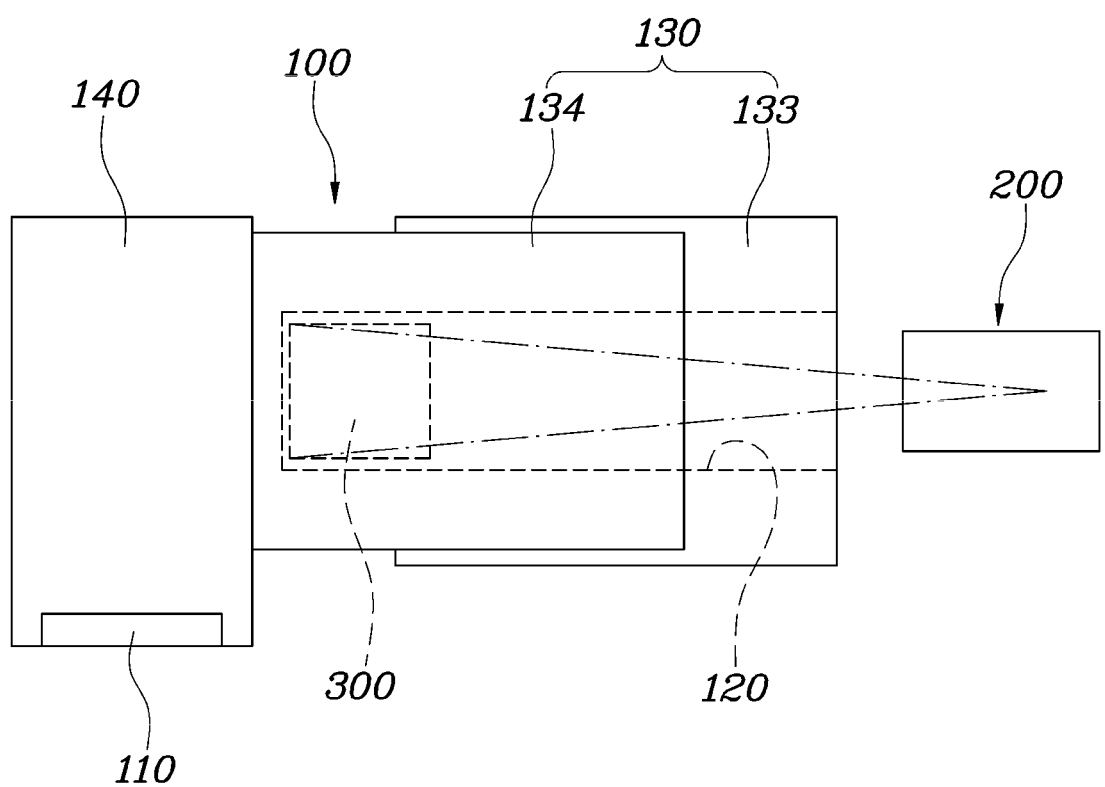
FIG. 12 is a view showing another embodiment of the side part according to the present disclosure.
Figure 13:
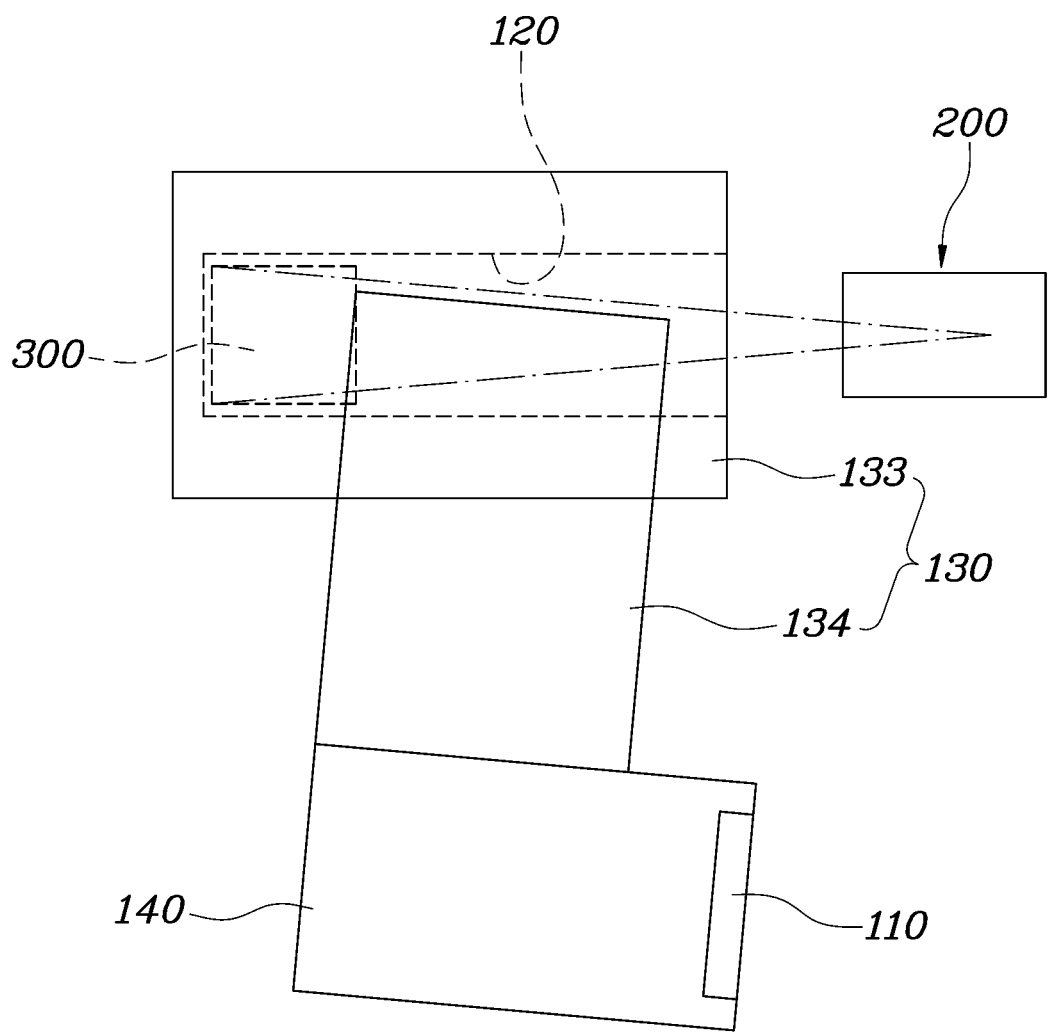
FIG. 13 is a view showing a developed state of the side part illustrated in FIG. 12.

In addition, FIG. 12 is a view showing another embodiment of the side part according to the present disclosure, and FIG. 13 is a view showing a developed state of the side part illustrated in FIG. 12.

Figure 14:
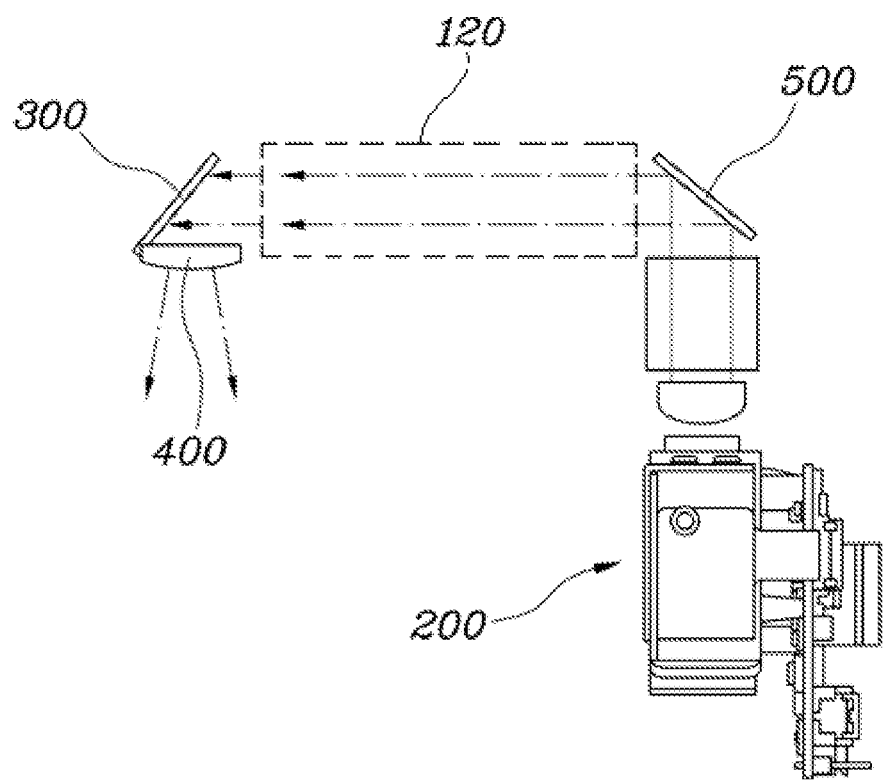
FIG. 14 is a view showing an embodiment according to a state in which a reflecting mirror is configured in the present disclosure.
Figure 15:
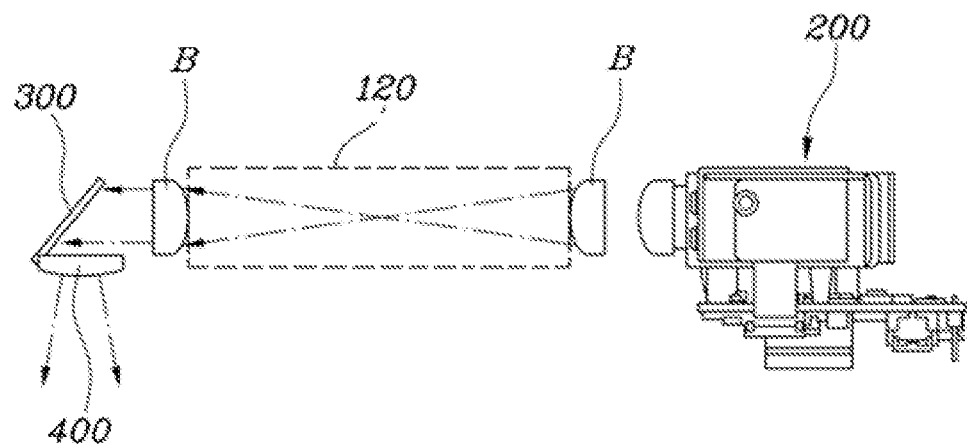
FIG. 15 is a view showing an embodiment according to a state in which a collection lens is configured in the present disclosure.
Figure 16:
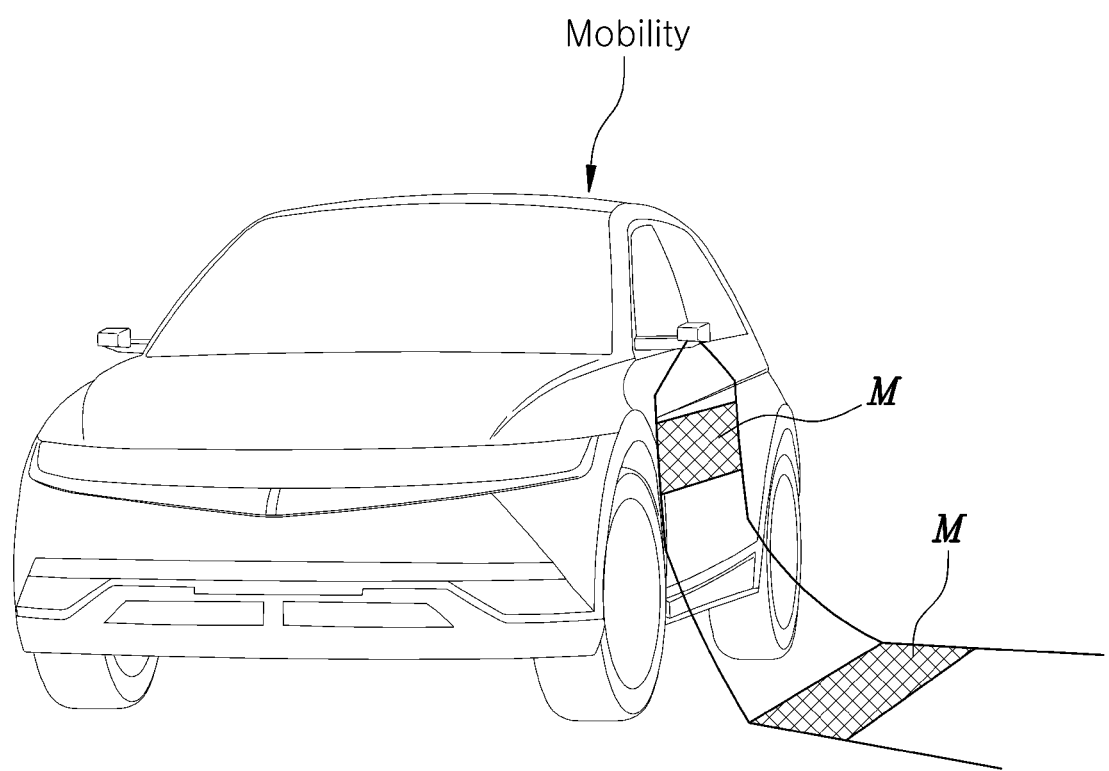
FIG. 16 is a view showing image implementation of the apparatus for a side projection lamp of a mobility device according to the present disclosure.

FIG. 14 is a view showing an embodiment according to a state in which a reflecting mirror is configured in the present disclosure, FIG. 15 is a view showing an embodiment according to a state in which a collection lens is configured in the present disclosure, and FIG. 16 is a view showing image implementation of the apparatus for a side projection lamp of a mobility device according to the present disclosure.

As shown in FIG. 1, the apparatus for a side projection lamp of a mobility device according to the present disclosure includes: a side part 100 installed on a vehicle body or a door A, provided with a rear recognizer 110 so as to secure rear lateral sight, and formed with a light movement space 120 at the inside thereof; an image transmitter 200 installed on the vehicle body or the door A and illuminating light for forming at least one image M into the light movement space 120 of the side part 100; and a reflection unit 300 installed in the light movement space 120 of the side part 100 and projecting the image M on a road surface or an outer surface of the mobility device by reflecting the light illuminated from the image transmitter 200.

The side part 100 is installed on the vehicle body or the door A at either one of opposite sides of the mobility device and is installed with the rear recognizer 110 configured to secure sight of the rear and lateral sides. Here, the rear recognizer 110 may be composed of a mirror configured to secure rear sight or may be composed of a camera configured to obtain a photograph of an outside of a rear or lateral side of the mobility device and allow the obtained photograph to be output indoors.

However, when the rear recognizer 110 is composed of the mirror, it is easy to install the image transmitter 200 in the side part 100 as the mirror does not have any restrictions on the installation position, whereas, when the rear recognizer 110 is composed of the camera, there arises a restriction in installing the image transmitter 200 together with the camera in the side part 100. That is, when both the rear recognizer 110 and the image transmitter 200 are installed in the side part 100, an overall size of the side part 100 becomes to increase.

Accordingly, in the present disclosure, the light movement space 120 is formed inside the side part 100, and the image transmitter 200 is installed in the vehicle body or the door A, whereby the light for forming the image is illuminated into the light movement space 120 of the side part 100. As such, as the image transmitter 200 is excluded, the size of the side part 100 is reduced, and the light illuminated from the image transmitter 200 moves in the light movement space 120 and then may be projected on the road surface or the outer surface of the mobility device by being reflected by the reflection unit 300.

On the other hand, the image transmitter 200 may be composed of a projector and installed on the vehicle body or the door A, so the size of the side part 100 may be reduced.

Accordingly, as shown in FIG. 3, the image transmitter 200 may include a light source 210 configured to illuminate the light, a variable mirror 220 configured to reflect the light illuminated from the light source 210 to form the image, and a lens 230 provided to make the light penetrate through a movement path of the light.

That is, the light source 210 may be composed of an LED, and the variable mirror 220 may be composed of a digital micromirror display (DMD). Through this, the light illuminated from the light source 210 may be projected, as various images by the variable mirror 220, on the road surface or the outer surface of the mobility device. In addition, a plurality of the lenses 230 is composed of refraction lenses, imaging lenses, and the like and may be respectively arranged in the movement path of the light, whereby the light illuminated from the light source 210 may be allowed to be reflected by the variable mirror 220 and then to be incident precisely in the reflection unit 300.

On the other hand, as shown in FIGS. 2 and 4, the apparatus for a side projection lamp of a mobility device further includes a magnification lens 400 installed in the light movement space 120 of the side part 100 to allow the light reflected through the reflection unit 300 to be incident thereon and configured to allow a size of the image according to the incident light to be adjusted.

Such a magnification lens 400 is installed at a lower end of the light movement space 120 of the side part 100 and, when the light reflected through the reflection unit 300 is projected to the outside, adjusts the size of the image due to the light so as to be visually recognizable from the outside.

In the case of the magnification lens 400, the magnification may be determined according to the size of the image according to the light illuminated from the image transmitter 200. In addition, the magnification lens 400 may be formed to allow the light reflected by the reflection unit 300 to be covered and may have the size being determined according to the range of the light.

As such, in the present disclosure, when the light illuminated from the image transmitter 200 is reflected by the reflection unit 300 and projected on the road surface or the outer surface of the mobility device, the size of the image is adjusted by the magnification lens 400 so that visibility of the corresponding image is ensured from the outside.

On the other hand, the reflection unit 300 may be configured to allow a projection position of the light illuminated from the image transmitter 200 to be adjusted by being installed to be able to rotate in the light movement space 120 of the side part 100.

That is, the reflection unit 300 is installed to be able to rotate in the light movement space 120, so the projection position and size of the image by the light illuminated from the image transmitter 200 may be adjusted according to the rotation angle of the reflection unit 300. For this reason, communication through the image projected on the road surface or the outer surface of the mobility device is easy.

In detail, as shown in FIG. 5, the reflection unit includes: a mirror part 310 installed to be able to rotate in the light movement space 120 and reflecting the light illuminated from the image transmitter 200; and a rotation driving part 320 adjusting a rotation position of the mirror part 310 by being connected to the mirror part 310.

As such, the reflection unit 300 includes the mirror part 310 and the rotation driving part 320, wherein the mirror part 310 may be installed to be able to rotate in the light movement space 120 of the side part 100 to adjust a movement direction of the light, and the rotation driving part 320 may be connected to the mirror part 310 to control the rotational position of the mirror part 310.

Here, the mirror part 310 is installed to be inclined obliquely in the light movement space 120 so that the incident light from the image transmitter 200 is reflected downward and moves. In addition, the rotation driving part 320 may be composed of a motor and is connected to the mirror part 310 to forcibly rotate the mirror part 310, thereby allowing the inclination angle to be adjusted.

Here, the rotation driving part 320 may be operated under the control of a controller, and the controller controls the rotation driving part 320 according to the position or size of the image to be projected on the road surface or the outer surface of the mobility device, whereby the position at which the light is finally emitted may be adjusted through adjustment of the angle of the mirror part 310.

Such a reflection unit 300 may be applied to various embodiments.

As an embodiment, as shown in FIGS. 5 to 6, the mirror part 310 is installed to be able to rotate in the light movement space 120 by the medium of a hinge part 311, and the rotation driving part 320 may be configured to rotate together with the hinge part 311 by being connected to the hinge part 311 by friction or a gear connection method.

As such, the mirror part 310 is installed to be able to rotate in the light movement space 120 of the side part 100 by the medium of the hinge part 311 and may be rotated together with the hinge part 311, with the hinge part 311 as a center axis. Here, the rotation driving part 320 is installed adjacent to the hinge part 311 and connected to the hinge part 311 by the friction connection method or the gear connection method, thereby, when transmitting rotational power, allowing the mirror part 310 to rotate together with the hinge part 311. Here, the rotation driving part 320 and the hinge part 311 are fastened in the gear connection method, so that the rotational position of the mirror part 310 may be precisely controlled.

For this reason, when the hinge part 311 is rotated according to the operation of the rotation driving part 320, the mirror part 310 may be adjusted in the rotation angle together with the hinge part 311, thereby switching the movement path of the light illuminated from the image transmitter 200. Accordingly, the image according to the light illuminated from the image transmitter 200 may be adjusted in its position according to information to be transmitted from the road surface or the outer surface of the mobility device.

On the other hand, as shown in FIG. 7 as another embodiment, a guide slot 121 may be extended in the light movement space 120 of the side part 100, and the mirror part 310 may have one end 310a connected to the rotation driving part 320 by the medium of a link unit 312 composed of a plurality of links and an opposite end 310b connected, to be movable, to the guide slot 121.

Here, the guide slot 121 may be extended in a straight line along the longitudinal direction of the side part 100 in the light movement space 120. The opposite end 310b of the mirror part 310 is connected to be movable to such a guide slot 121 along the guide slot 121, and one end 310a of the mirror part 310 is connected to the rotation driving part 320 by the medium of the link unit 312.

For this reason, when the rotation driving part 320 is operated, while being rotated, the plurality of links constituting the link unit 312 rotates the mirror part 310. At this time, as the opposite end 310b of the mirror part 310 is moved in the guide slot 121, the mirror part 310 is rotated so that only the inclination angle is adjusted in the line of the guide slot 121. This is to minimize a dead zone for the light illuminated from the image transmitter 200, and a situation, in which the light is not incident on the mirror part 310 as the mirror part 310 is rotated, is to be avoided.

Here, the link unit 312 is composed of a four bar link, whereby the inclination angle adjustment of the mirror part 310 according to the rotation of each link may be smoothly performed during the operation of the rotation driving part 320.

As such, the mirror part 310 has one end 310a connected to the rotation driving part 320 through the media of the link unit 312 and the opposite end 310b moved along the guide slot 121. Accordingly, when the rotation driving part 320 is operated, the mirror part 310 is adjusted only in the inclination angle in a state of being positioned in the moving direction of the light illuminated from the image transmitter 200, whereby the dead zone for the light is prevented and an accurate image may be projected.

On the other hand, as still another embodiment, as shown in FIG. 8, a rotation driving part 320 is formed with a cam portion 321 formed eccentrically from a center axis, and a mirror part 310 may be installed to have one end 310a contacted with the cam portion 321 and an opposite end 310b to be able to rotate in a light movement space 120 by the medium of a hinge part 311.

As such, the mirror part 310 becomes to have a position fixed by the opposite end 310b that is installed in the light movement space 120 of the side part 100 by the medium of the hinge part 311. In addition, the mirror part 310 becomes to have the inclination angle adjusted by the cam portion 321 which rotates according to the rotation driving part 320 operated in a state in which the one end is in contact with the cam portion 321.

Here, the cam portion 321 may be eccentrically formed in an elliptical shape, and the rotation driving part 320 is eccentrically connected to the cam portion 321, so that when the cam portion 321 rotates according to the operation of the rotation driving part 320, the inclination angle of the mirror part 310 may be adjusted. This is to minimize a dead zone for the light illuminated from the image transmitter 200, and a situation in which the light is not incident on the mirror part 310 as the inclination angle of the mirror part 310 is adjusted is avoided.

In addition, the mirror part 310 has one end to which an elastic body 313 installed in the light movement space 120 is connected, whereby the one end of the mirror part 310 comes in contact with the cam portion 321 by elastic force of the elastic body 313.

The elastic body 313 may be composed of a compression spring and provide the elastic force in a direction in which the one end 310a of the mirror part 310 comes into contact with the cam portion 321. For this reason, the one end 310a of the mirror part 310 is maintained in a status of being in contact with the cam portion 321 by the elastic body 313, so that the angle may be smoothly adjusted by the rotation of the cam portion 321.

As such, the mirror part 310 may have one end 310a contacted with the cam portion 321 and the opposite end 310b connected to be able to rotate by the media of the hinge part 311. Accordingly, the mirror part 310 may be adjusted only in the inclination angle by the rotation of the cam portion 321 according to the operation of the rotation driving part 320 in a state of being positioned in the moving direction of the light illuminated from the image transmitter 200, whereby the dead zone for the light may be prevented, and an accurate image may be projected.

On the other hand, the side part 100 may be configured to be stowed in a situation in which it is unnecessary to secure a rear sight such as a situation in which the mobility device is parked and the like.

To this end, as shown in FIG. 2, the side part 100 includes: a neck part 130 installed on the vehicle body or the door A and provided with the light movement space 120 and the reflection unit 300; and a head part 140 installed at an end of the neck part 130 and installed with a rear recognizer 110.

As such, the side part 100 includes the neck part 130 and the head part 140, wherein the neck part 130 is formed with the light movement space 120, and the head part 140 installed with the rear recognizer 110 is connected to the end of the neck part 130.

For this reason, in the side part 100, the light illuminated from the image transmitter 200 installed in the vehicle body or the door A moves toward the reflection unit 300 by being incident on the light movement space 120 of the neck part 130 and may be projected on the road surface or the outer surface of the mobility device while moving downward by being reflected by the reflection unit 300.

In particular, the neck part 130 and the head part 140 are composed of a sliding or rotating structure, so the side part 100 may be configured to have the overall size to be reduced.

As an embodiment according to this, as shown in FIGS. 9 to 11, the neck part 130 may include a base part 131 installed on the vehicle body or the door A and a sliding part 132 that moves by sliding from the base part 131 and to which the head part 140 is connected.

Here, the light movement space 120 extends to communicate with the base part 131 and the sliding part 132 in a straight line.

In addition, the reflection unit 300 may be installed in the light movement space 120 of the side of the sliding part 132, thereby moving together with the sliding part 132.

That is, the neck part 130 is composed of the base part 131 and the sliding part 132 and configured to have a structure in which the sliding part 132 moves by being slid, thereby being inserted in the base part 131. Accordingly, the overall size of the neck part 130 may be reduced. Accordingly, the base part 131 may be formed so that the sliding part 132 is inserted therein, and in the base part 131, a latching structure configured to limit excessive movement of the sliding part 132 and a sealing structure configured to maintain airtightness between the base part 131 and the sliding part 132 may be applied.

In addition, as may be seen in FIG. 9, the base part 131 and the sliding part 132 are each formed to have an open lower surface, the light illuminated from the image transmitter 200 may be projected downward when reflected by the reflection unit 300. Here, the magnification lens 400 may be provided in each of the open portions of the base part 131 and the sliding part 132.

For this reason, when the sliding part 132 is in a state of being withdrawn from the base part 131, the light illuminated from the image transmitter 200 may be moved to the light movement space 120, reflected by the reflection unit 300, and then projected on the road surface or the outer surface of the mobility device. In addition, even when the sliding part 132 is in a state of being inserted into the base part 131, the light illuminated from the image transmitter 200 may be moved to the light movement space 120, reflected by the reflection unit 300, and then projected on the road surface or the outer surface of the mobility device.

In addition, the reflection unit 300 is installed in the light movement space 120 of the side of the sliding part 132, and moved together with the sliding part 132, thereby implementing various types of images by adjusting the size or position of the image according to the light illuminated from the image transmitter 200 through an operation in which the sliding part 132 moves from the base part 131.

As such, the neck part 130 is composed of the base part 131 and the sliding part 132, and the sliding part 132 may be withdrawn from or inserted into the base part 13, whereby the side part 100 according to the embodiment may be adjusted in the overall size according to parking or driving conditions of the mobility device.

In addition, through the movement of the sliding part 132, the size or position of the image according to the light illuminated from the image transmitter 200 may be adjusted, so it is possible to implement various types of images.

Here, the above-described movement of the sliding part 132 may be implemented by a motor installed in the base part 131.

On the other hand, as another embodiment, as shown in FIGS. 12 to 13, the neck part 130 may include a fixed part 133 installed on the vehicle body or the door A and a rotating part 134 that is installed to be able to rotate at an upper end of the fixed part 133 and to which the head part 140 is connected.

Here, the light movement space 120 is formed in the fixed part 133.

That is, the neck part 130 is composed of a fixed part 133 and a rotating part 134 and has a structure in which the rotating part 134 is folded by being rotated at the fixed part 133, so the overall size of the neck part 130 may be reduced.

Accordingly, the fixed part 133 is installed on the vehicle body or the door A and formed with the light movement space 120 therein so that the light illuminated from the image transmitter 200 may be incident on the light movement space 120 and then reflected by the reflection unit 300, thereby being projected on the road surface or the outer surface of the mobility device.

Here, the rotating part 134 is installed to be able to rotate on the upper end of the fixed part 133, so that the head part 140 may be folded by being rotated by the rotation of the rotating part 134. In addition, the rotating part 134 is installed on the upper end of the fixed part 133, thereby not interfering with the light emitted from the light movement space 120 of the fixed part 133.

Here, the above-described movement of the rotating part 134 may be implemented by a motor installed in the fixed part 133.

As such, the neck part 130 is composed of the fixed part 133 and the rotating part 134, and the rotating part 134 may be rotated at the fixed part 133, so that the side part 100 according to another embodiment may be adjusted in the overall size according to parking or driving conditions of the mobility device.

On the other hand, as shown in FIG. 14, the image transmitter 200 is installed to be spaced apart from the side part 100, and a reflection mirror 500, configured to allow the light illuminated from the image transmitter 200 to be reflected and moved to the light movement space 120, may be provided on the vehicle body or the side part 100.

When the image transmitter 200 is installed on the vehicle body or the door A, space restrictions may occur. Therefore, the image transmitter 200 is installed to be spaced apart from the side part 100, and the reflection mirror 500 may be installed on the vehicle body or the side part 100 and may allow the light illuminated from the image transmitter 200 to be reflected and moved to the light movement space 120. For this reason, the space limitation caused by installing the image transmitter 200 is avoided, so the installation of the image transmitter 200 is easy.

In addition, as shown in FIG. 15, a collection lens B may be further provided in the light movement space 120 of the side part 100. For this reason, the light illuminated from the image transmitter 200 is moved by being focused, thereby moving smoothly toward the reflection unit 300 with directionality in the light movement space 120. In addition, it is possible to allow the image according to the light illuminated from the image transmitter 200 to be accurately projected finally by further applying not only the collection lens B but also an inverting lens.

The apparatus for a side projection lamp of a mobility device having a structure as described above can secure rear lateral sight from opposite lateral sides of the mobility device and illuminate light of a specific image on a road surface or an outer surface of the mobility device, thereby being allowed to communicate with a driver. In addition, the projection range of the image may be adjusted by the reflection unit 300 so that the size and quality of the image may be adjusted, thereby replacing displays of the opposite lateral sides of the mobility device.

In addition, as the image transmitter configured to generate a specific image is installed on the vehicle body or the door side, the size of the side part configured to secure rear sight is reduced.

As shown in FIG. 16, the light illuminated from the image transmitter 200 may be reflected by the reflection unit 300 configured to be able to rotate and be projected on the road surface or the outer surface of the mobility device, thereby implementing various images.

Although the present disclosure has been shown and described in relation to specific embodiments, it will be obvious to those of ordinary skill in the art that the present disclosure may be variously improved and changed within a scope without departing from the technical spirit of the present disclosure provided by the following claims.

What is claimed is:

1. An apparatus for a side projection lamp of a mobility device, the apparatus comprising:
   a side part installed on a vehicle body or a door, provided with a rear recognizer so as to secure rear lateral sight, and formed with a light movement space at an inside of the side part;

an image transmitter installed on the vehicle body or the door and illuminating light for forming at least one image into the light movement space of the side part; and a reflection unit installed in the light movement space of the side part and projecting the image on a road surface or an outer surface of the mobility device by reflecting the light illuminated from the image transmitter.

2. The apparatus of claim 1, wherein the rear recognizer includes a camera configured to obtain a photograph of an outside of a rear or lateral side of the mobility device and allow the obtained photograph to be output indoors.

3. The apparatus of claim 1, wherein the image transmitter includes:
a light source configured to illuminate the light;
a variable mirror configured to reflect the light illuminated from the light source to form the image; and
a lens provided to make the light penetrate through a movement path of the light.

4. The apparatus of claim 1, further comprising a magnification lens installed in the light movement space of the side part to allow the light reflected through the reflection unit to be incident thereon and configured to allow a size of the image according to the incident light to be adjusted.

5. The apparatus of claim 1, wherein the reflection unit is configured to allow a projection position of the light illuminated from the image transmitter to be adjusted by being installed to be able to rotate in the light movement space of the side part.

6. The apparatus of claim 5, wherein the reflection unit includes:
a mirror part installed to be able to rotate in the light movement space and configured to reflect the light illuminated from the image transmitter; and
a rotation driving part configured to adjust a rotation position of the mirror part by being connected to the mirror part.

7. The apparatus of claim 6, wherein the mirror part is installed to be able to rotate in the light movement space by a hinge part, and
the rotation driving part is configured to allow the mirror part to rotate together with the hinge part by being connected to the hinge part by a friction connection method or a gear connection method.

8. The apparatus of claim 6, wherein a guide slot is extended in the light movement space of the side part, and the mirror part has one end connected to the rotation driving part by a link unit composed of a plurality of links and an opposite end connected, to be movable, to the guide slot.

9. The apparatus of claim 6, wherein the rotation driving part is formed with a cam portion formed eccentrically from a center axis, and
the mirror part is installed to have one end contacted with the cam portion and an opposite end to be able to rotate in the light movement space by a hinge part.

10. The apparatus of claim 9, wherein the mirror part has one end to which an elastic body installed in the light movement space is connected, whereby the one end of the mirror part comes in contact with the cam portion by elastic force of the elastic body.

11. The apparatus of claim 1, wherein the side part includes:
a neck part installed on the vehicle body or the door and provided with the light movement space and the reflection unit; and
a head part installed at an end of the neck part and installed with the rear recognizer.

12. The apparatus of claim 11, wherein the neck part includes a base part installed on the vehicle body or the door and a sliding part that moves by sliding from the base part and to which the head part is connected,
wherein the light movement space extends to communicate with the base part and the sliding part in a straight line.

13. The apparatus of claim 12, wherein the reflection unit is installed in the light movement space of a side of the sliding part, thereby moving together with the sliding part.

14. The apparatus of claim 11, wherein the neck part includes a fixed part installed on the vehicle body or the door and a rotating part that is installed to be able to rotate at an upper end of the fixed part and to which the head part is connected, and
the light movement space is formed in the fixed part.

15. The apparatus of claim 1, wherein the image transmitter is installed to be spaced apart from the side part, and
a reflection mirror, configured to allow the light illuminated from the image transmitter to be reflected and moved to the light movement space, is provided on the vehicle body or the side part.

* * * * *